United States Patent
Dino et al.

(10) Patent No.: US 8,728,990 B2
(45) Date of Patent: May 20, 2014

(54) PHOSPHATE ESTER OIL GELLANT

(75) Inventors: David Dino, Cranbury, NJ (US); Alart Mulder, Deventer (NL)

(73) Assignee: Elementis Specialties, Inc., East Windsor, NJ (US)

( * ) Notice: Subject to any disclaimer, the term of this patent is extended or adjusted under 35 U.S.C. 154(b) by 653 days.

(21) Appl. No.: 12/631,428

(22) Filed: Dec. 4, 2009

(65) Prior Publication Data

US 2011/0136705 A1 Jun. 9, 2011

(51) Int. Cl.
*C09K 8/64* (2006.01)
*C02F 5/10* (2006.01)
*C09K 8/528* (2006.01)

(52) U.S. Cl.
USPC ............ 507/238; 507/235; 507/237

(58) Field of Classification Search
USPC ..................... 507/238, 235, 237
See application file for complete search history.

(56) References Cited

U.S. PATENT DOCUMENTS

| | | |
|---|---|---|
| 3,494,949 A | 2/1970 | Monroe |
| 3,505,374 A | 4/1970 | Monroe |
| 3,575,859 A | 4/1971 | Monroe |
| 3,757,864 A | 9/1973 | Crawford et al. |
| 4,007,128 A | 2/1977 | Poklacki |
| 4,104,173 A | 8/1978 | Gay et al. |
| 4,153,649 A | 5/1979 | Griffin, Jr. |
| 4,174,283 A | 11/1979 | Griffin, Jr. |
| 4,200,539 A | 4/1980 | Burnham et al. |
| 4,200,540 A | 4/1980 | Burnham |
| 4,278,129 A | 7/1981 | Walton |
| 4,301,025 A | 11/1981 | Brady et al. |
| 4,316,810 A | 2/1982 | Burnham |
| 4,393,935 A | 7/1983 | Walton |
| 4,480,692 A | 11/1984 | Stapp |
| 4,507,213 A * | 3/1985 | Daccord et al. ............... 507/238 |
| 4,541,483 A | 9/1985 | Walton |
| 4,622,155 A | 11/1986 | Harris et al. |

(Continued)

FOREIGN PATENT DOCUMENTS

EP 0225661 A2 6/1987

OTHER PUBLICATIONS

Weldon M. Harms, "Application of Chemistry in Oil and Gas Well Fracturing", American Chemical Society, Chapter 2, pp. 55-100, 1989.

(Continued)

*Primary Examiner* — Susannah Chung
*Assistant Examiner* — Atnaf Admasu
(74) *Attorney, Agent, or Firm* — Morgan, Lewis & Bockius LLP

(57) ABSTRACT

A composition and method of fracturing a subterranean formation. The composition includes: about 0.25 wt. % to about 3.0 wt. %, based on a weight of the hydrocarbon liquid, of a mixture of phosphate esters, said esters selected from the group consisting of: monoester $PO(OR^1)(OH)_2$, $PO(OR^2)(OH)_2$; diester $PO(OH)(OR^1)_m(OR^2)_{2-m}$ where m=0, 1, or 2; triester $PO(OH)(OR^1)_n(OR^2)_{3-n}$ where n=0, 1, 2 or 3; and phosphoric acid $H_3PO_4$ wherein $R^1$ and $R^2$ each have 2 to 18 carbon atoms; and about 0.2 wt. % to about 1.0 wt. %, based on the weight of the hydrocarbon liquid, of an acidic polynuclear aluminum compound having an Al:Cl mole ratio ranging from about 1.40:1 to about 2.2:1. The composition is added to a hydrocarbon liquid to fracture the subterranean formation with this hydrocarbon liquid. The hydrocarbon liquid containing the composition exhibits a substantially constant viscosity.

13 Claims, 6 Drawing Sheets

(56) References Cited

U.S. PATENT DOCUMENTS

| | | | |
|---|---|---|---|
| 4,781,845 A | 11/1988 | Syrinek et al. |
| 4,787,494 A | 11/1988 | Ogasawara et al. |
| 4,921,990 A | 5/1990 | Uphues et al. |
| 5,017,360 A | 5/1991 | Katsoulis |
| 5,034,139 A | 7/1991 | Reid et al. |
| 5,057,233 A | 10/1991 | Huddleston |
| 5,086,841 A | 2/1992 | Reid et al. |
| 5,110,485 A | 5/1992 | Huddleston |
| 5,118,497 A | 6/1992 | Katsoulis |
| 5,202,035 A | 4/1993 | Huddleston |
| 5,202,123 A | 4/1993 | Katsoulis |
| 5,217,074 A | 6/1993 | McDougall et al. |
| 5,271,464 A | 12/1993 | McCabe |
| 5,362,418 A | 11/1994 | Yamasaki et al. |
| 5,417,287 A | 5/1995 | Smith et al. |
| 5,514,645 A | 5/1996 | McCabe et al. |
| 5,571,315 A | 11/1996 | Smith et al. |
| 5,611,991 A | 3/1997 | Naraghi |
| 5,611,992 A | 3/1997 | Naraghi et al. |
| 5,614,010 A | 3/1997 | Smith et al. |
| 5,647,900 A | 7/1997 | Smith et al. |
| 5,649,596 A | 7/1997 | Jones et al. |
| 5,807,812 A | 9/1998 | Smith et al. |
| 5,846,915 A | 12/1998 | Smith et al. |
| 5,874,385 A | 2/1999 | Mzik et al. |
| 5,948,735 A | 9/1999 | Newlove et al. |
| 5,990,053 A | 11/1999 | Jones et al. |
| 6,004,908 A | 12/1999 | Graham et al. |
| 6,054,417 A | 4/2000 | Graham et al. |
| 6,147,034 A | 11/2000 | Jones et al. |
| 6,149,693 A | 11/2000 | Geib |
| 6,261,998 B1 | 7/2001 | Amin et al. |
| 6,271,409 B1 | 8/2001 | Geib |
| 6,297,201 B1 | 10/2001 | Geib |
| 6,302,209 B1 | 10/2001 | Thompson, Sr. et al. |
| 6,342,468 B1 | 1/2002 | Geib |
| 6,512,133 B1 | 1/2003 | Gotzmann et al. |
| 6,544,934 B2 | 4/2003 | Taylor et al. |
| 6,579,995 B1 | 6/2003 | West |
| 6,602,828 B2 | 8/2003 | Amin et al. |
| 6,630,151 B1 | 10/2003 | Tarletsky et al. |
| 6,719,053 B2 | 4/2004 | Thompson |
| 6,783,755 B2 | 8/2004 | Kajino et al. |
| 6,849,581 B1 | 2/2005 | Thompson et al. |
| 7,163,060 B2 | 1/2007 | Weiss et al. |
| 7,261,158 B2 | 8/2007 | Middaugh et al. |
| 7,306,040 B1 | 12/2007 | Robb et al. |
| 7,314,850 B2 | 1/2008 | Taylor et al. |
| 7,328,744 B2 | 2/2008 | Taylor et al. |
| 7,521,400 B2 | 4/2009 | Samuel |
| 7,534,745 B2 | 5/2009 | Taylor et al. |
| 7,541,484 B2 | 6/2009 | Ueyama et al. |
| 7,749,946 B2 | 7/2010 | Lawrence et al. |
| 2007/0173413 A1 | 7/2007 | Lukocs et al. |
| 2007/0197402 A1 | 8/2007 | O'neil et al. |
| 2007/0204991 A1 | 9/2007 | Loree et al. |
| 2007/0213232 A1 | 9/2007 | Hartshorne et al. |
| 2007/0277981 A1 | 12/2007 | Robb et al. |
| 2007/0281870 A1 | 12/2007 | Robb et al. |
| 2008/0108519 A1 | 5/2008 | Harris et al. |
| 2008/0146463 A1 | 6/2008 | Taylor et al. |
| 2008/0296022 A1 | 12/2008 | Brown et al. |
| 2009/0054273 A1 | 2/2009 | Lawrence et al. |

OTHER PUBLICATIONS

Written Opinion of PCT/US2010/058922 dated Apr. 6, 2011, 5 pages.
International Search Report of PCT/US2010/058922 dated Apr. 6, 2011, 5 pages.
International Preliminary Report on Patentability for PCT/US2010/058922 dated Jun. 14, 2012, 7 pages.
Publication of PCT/US2010/058922 dated Jun. 9, 2011, 28 pages.

\* cited by examiner

PHOSPHATE ESTER OIL GELLANT

BACKGROUND

Many known oil based fracturing fluid compositions include a phosphate ester and an iron or an aluminum crosslinker. Compositions using an aluminum crosslinker may have a high sensitivity to the amount of crosslinker included in the formulation, which is demonstrated by a sharp viscosity break. Compositions using an iron crosslinker are typically lower in effectiveness as compared to the aluminum crosslinker systems. Where viscosity of a fracturing composition is a function of crosslinker concentration, a break is described as a decrease in viscosity of a fracturing composition upon reaching a certain concentration of crosslinker. Such crosslinker concentration may be referred to as a breakpoint concentration. Generally, the existence of an engineerable break is desirable in fracturing, as it assists with removal of oil or other substances from a fracture by allowing flowback. However, a sharp break caused by the concentration of one of the viscosity building products causes difficulties as it can be challenging to engineer. In particular, prior art aluminum compositions are well known to show sensitivity to water, pH and crosslinker concentration. The present invention addresses such problems as sensitivity to crosslinker concentration.

SUMMARY OF INVENTION

According to some embodiments, a method of fracturing a subterranean formation includes adding to a hydrocarbon liquid to be used as a fracturing fluid a composition including (a) about 0.25 wt. % to about 3.0 wt. %, based on a weight of the hydrocarbon liquid, of a mixture of phosphate esters, the esters selected from the group consisting of: monoester $PO(OR^1)(OH)_2$, $PO(OR^2)(OH)_2$; diester $PO(OH)(OR^1)_m(OR^2)_{2-m}$ where m =0, 1, or 2; triester $PO(OR^1)_n(OR^2)_{3-n}$ where n =0, 1, 2 or 3; and phosphoric acid $H_3PO_4$ wherein $R_1$ and $R_2$ each have 2 to 18 carbon atoms; and (b) about 0.2 wt. % to about 1.0 wt. %, based on the weight of the hydrocarbon liquid, of an acidic polynuclear aluminum compound having an Al:Cl mole ratio ranging from about 1.40:1 to about 2.2:1, where the fracturing fluid composition is characterized by a substantially constant viscosity value; and fracturing a subterranean formation with this hydrocarbon liquid.

In some embodiments, the polynuclear aluminum compound is added in an amount to provide a molar ratio of aluminum ion in the polynuclear aluminum compound to organic phosphate ranging from about 0.2:1 to about 2.0:1, or from about 0.4:1 to about 1.5:1.

In some embodiments, the mixture of phosphate esters is based on a reaction product of a trialkylphosphate, phosphorus pentoxide and an alcohol. In certain embodiments, $R^2$ is selected from hexyl, octyl, decyl and dodecyl. In some embodiments, $R^1$ is ethyl. In some embodiments, $R^1$ is ethyl and $R^2$ is selected from octyl and decyl. In certain embodiments, $R^1$ and $R^2$ each have 2 to 12 carbon atoms. In some embodiments, the trialkylphosphate is triethylphosphate and the alcohol includes octanol and decanol.

According to some embodiments, a fracturing composition includes (a) a hydrocarbon liquid, (b) about 0.6 wt. % to about 0.9 wt. % based on a weight of the hydrocarbon liquid, of a mixture of phosphate esters, the esters selected from the group consisting of: monoester $PO(OR^1)(OH)_2$, $PO(OR^2)(OH)_2$, diester $PO(OH)(OR^1)_m(OR^2)_{2-m}$ where m =0, 1, or 2; triester $PO(OR^1)_n(OR^2)_{3-n}$ where n =0, 1, 2 or 3; and phosphoric acid $H_3PO_4$ wherein $R^1$ and $R^2$ each have 2 to 18 carbon atoms; and (c) about 0.2 wt. % to about 0.8 wt. % based on the weight of the hydrocarbon liquid of an acidic polynuclear aluminum compound having an Al:Cl mole ratio ranging from about 1.40:1 to about 2.2:1, where the fracturing composition is characterized by a substantially constant viscosity value.

In some embodiments, $R^2$ is selected from hexyl, octyl, decyl and dodecyl. In certain embodiments, $R^1$ is ethyl. In some embodiments, $R^1$ is ethyl and $R^2$ is selected from octyl and decyl. In some embodiments, $R^1$ and $R^2$ each have 2 to 12 carbon atoms. In further embodiments, a molar ratio of aluminum ion in the polynuclear aluminum compound to organic phosphate ranges from about 0.2:1 to about 2.0:1, or from about 0.4:1 to about 1.5:1.

According to some embodiments, a composition includes (a) a mixture of phosphate esters, the esters selected from: monoester $PO(OR^1)(OH)_2$, $PO(OR^2)(OH)_2$; diester $PO(OH)(OR^1)_m(OR^2)_{2-m}$ where m=0, 1, or 2; triester $PO(OR^1)_n(OR^2)_{3-n}$ where n =0, 1, 2 or 3; and phosphoric acid $H_3PO_4$ wherein $R^1$ and $R^2$ each have 2 to 18 carbon atoms; and (b) an acidic polyaluminum aluminum compound having a formula of $Al_x(OH)_yCl_{(3x-y)}$, where $0 < x < 3y$.

In some embodiments, x is 2 and y is 5. In some embodiments, a composition includes a polyamine compound selected from a polyhydroxylalkylamine and a polyquaternary amine. In certain embodiments, $R^2$ is selected from hexyl, octyl, decyl and dodecyl. In some embodiments, $R^1$ is ethyl. In some embodiments, $R^1$ is ethyl and $R^2$ is selected from octyl and decyl. In certain embodiments, $R^1$ and $R^2$ each have 2 to 12 carbon atoms.

DESCRIPTION OF DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings.

DESCRIPTION OF INVENTION

Figure 1:
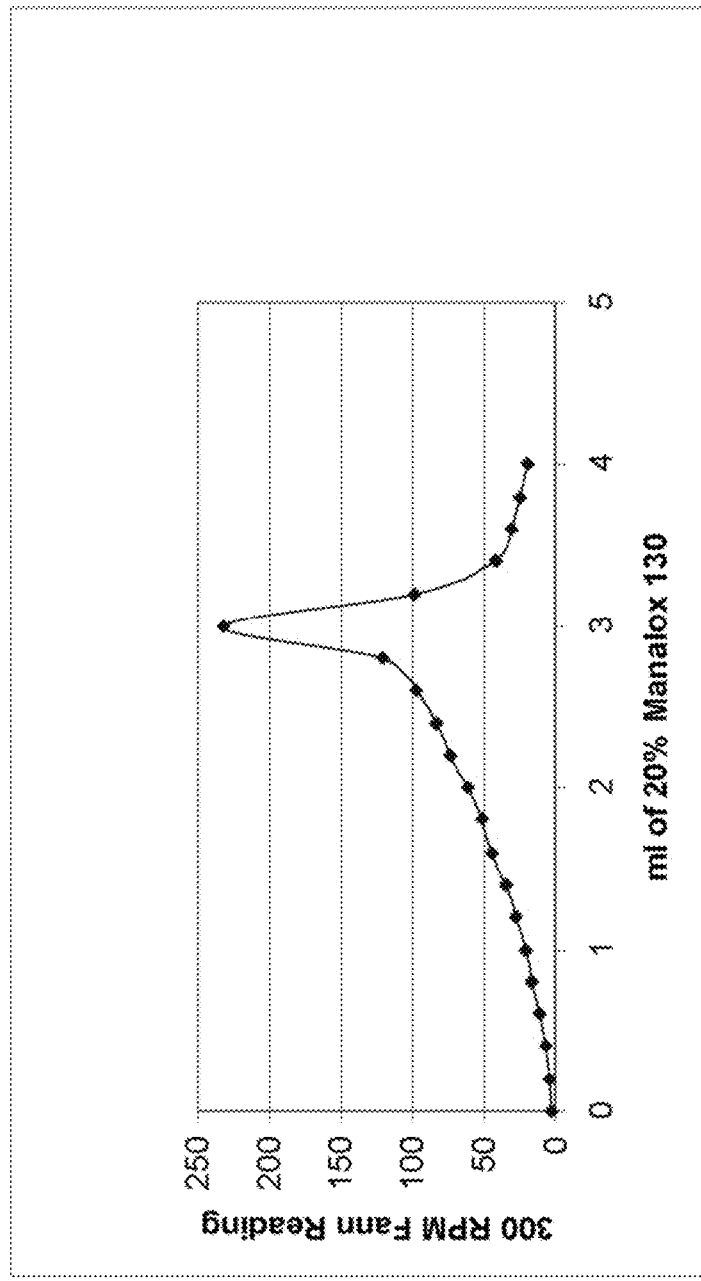
FIG. 1 illustrates the gelling performance of a prior art aluminum isopropoxide crosslinking system.

Compositions and methods of the present invention may be useful for oil-based fracturing subterranean formations, such as in oil or gas wells. The compositions unexpectedly provide a substantially constant and efficient viscosity to a gelled hydrocarbon over a wide range of aluminum concentrations. For the purposes of this application, a substantially constant viscosity is measured using number 2 diesel oil and about 2.0 wt % phosphate over a range of aluminum crosslinker concentration. In one embodiment, a substantially constant viscosity measurement means a change in hydrocarbon viscosity of less than or equal to 30% as the aluminum concentration of the fracturing composition is greater than or equal to about 0.3 times the phosphate ester concentration. In another embodiment, a substantially constant viscosity measurement means a change in hydrocarbon viscosity of less than or equal to 20% as the aluminum concentration of the fracturing composition is greater than or equal to about 0.3 times the phosphate ester concentration. In yet another embodiment, a substantially constant viscosity measurement means a change in hydrocarbon viscosity of less than or equal to 10% as the aluminum concentration of the fracturing composition is greater than or equal to about 0.3 times the phosphate ester concentration. In still yet another embodiment, a substantially constant viscosity measurement means a change in hydrocarbon viscosity of less than or equal to 5% as the aluminum concentration of the fracturing composition is greater than or equal to about 0.3 times the phosphate ester concentration. In one embodiment, the substantially constant viscosity value is measured using a Fann viscometer at 300 rpm. In one embodiment, the hydrocarbon viscosity corresponds to a 300 rpm Fann reading of; greater than 150; and a range from about 150 to about 175.

Composition

In some embodiments, the present invention provides for a composition containing a phosphate ester and an acidic polyaluminum compound having a formula of $Al_x(OH)_yCl_{(3x-y)}$ where $0<x<3y$. The composition may optionally include a polyamine compound.

In some embodiments, a fracturing composition includes a hydrocarbon liquid, a phosphate composition and a crosslinker. In one such embodiment, the fracturing composition includes: a hydrocarbon liquid; about 0.25 wt. % to about 3.0 wt. % based on a weight of the hydrocarbon liquid, of a phosphate composition; and about 0.2 wt. % to about 1.0 wt. % based on the weight of the phosphate of an acidic polynuclear aluminum compound. In one embodiment, the fracturing composition includes: a hydrocarbon liquid; about 0.6 wt. % to about 0.9 wt. % based on a weight of the hydrocarbon liquid, of a phosphate composition; and about 0.2 wt. % to about 0.8 wt. % based on the weight of the phosphate of an acidic polynuclear aluminum compound. In one embodiment, the fracturing composition is characterized by a substantially constant viscosity measurement. For the purposes of this application about shall mean +/−10%.

Phosphate Composition

In some embodiments, a fracturing composition includes a phosphate composition. In some embodiments, the phosphate composition includes a phosphate ester. The phosphate composition may be an organic phosphate. In some embodiments, a fracturing composition includes a phosphate composition which contains a mixture of: monoesters $PO(OR^1)(OH)_2$, $PO(OR^2)(OH)_2$; diesters $PO(OH)(OR^1)_m(OR^2)_{2-m}$ where m =0, 1, or 2; triesters $PO(OR^1)_n(OR^2)_{3-n}$ where n =0, 1, 2 or 3; and phosphoric acid $H_3PO_4$ wherein $R^1$ and $R^2$ may be independently a straight or branch chain alkyl, aryl, alkoxy or alkaryl group (saturated, unsaturated, hetero atoms) having from 2 to about 18 carbon atoms. The major component is the diester compound at concentrations greater than: 65 wt.%; 70 wt.% or 75 wt. %. In some embodiments, $R^1$ and $R^2$ may have 2 to 12 carbon atoms. In some embodiments, $R^1$ may include ethyl, butyl, hexyl, octyl, decyl and/or dodecyl groups and $R^2$ may include hexyl, octyl, decyl and/or dodecyl groups. In some other embodiments, $R^1$ may include ethyl, butyl, octyl and/or decyl groups and $R^2$ may include hexyl, octyl, decyl and/or dodecyl groups. In some yet other embodiments, $R^1$ may include an ethyl group and $R^2$ may include octyl and/or decyl groups. In certain embodiments, a phosphate composition is based on a reaction product of a trialkylphosphate, phosphorus pentoxide and alcohol. In some such embodiments, the trialkylphosphate may include triethylphosphate, tributylphosphate, tri-tertbutylphosphate, or tris(2-ethylhexyl)phosphate. In some such embodiments, phosphoric anhydride includes phosphorous pentoxide. In some such embodiments, an alcohol includes a mixed linear alcohol including but not limited to octanol and decanol. In some other such embodiments, an alcohol includes: a mixed linear alcohol including but not limited hexanol mixed with dodecanol; fatty alcohol mixtures; isofols, and the like. Commercial mixed alcohols such as Alfol 810, Alfol 1012, Alfol 1014, or Alfol 1618 may be used as the mixed alcohol source. In certain embodiments, a phosphate composition is based on a reaction product of a triethylphosphate, phosphorous pentoxide and a mixed linear alcohol containing octanol and decanol.

According to some embodiments, a fracturing fluid includes: about 0.25 wt % to about 3.0 wt % of a phosphate ester; about 0.4 wt % to about 2.0 wt % of a phosphate ester; or about 0.6 wt % to about 1.5 wt % of a phosphate ester. According to some embodiments, a fracturing fluid includes: about 0.3 wt % to about 1.5 wt % of a phosphate ester; about 0.4 wt % to about 1.2 wt % of a phosphate ester; or about 0.6 wt % to about 1.0 wt % of a phosphate ester. In some embodiments, a fracturing fluid includes a phosphate in an amount of about 0.2 wt %; about 0.25 wt %; about 0.3 wt %; about 0.4 wt %; about 0.5 wt %; about 0.6 wt %; about 0.7 wt %; about 0.8 wt %; about 0.9 wt %; about 1.0 wt %; about 1.1 wt %; about 1.2 wt %; about 1.3 wt %; about 1.4 wt %; or about 1.5 wt %; about 1.6 wt %; about 1.7 wt %; about 1.8 wt %; about 1.9 wt %; about 2.0 wt %; about 2.1 wt %; about 2.2 wt %; about 2.3 wt %; about 2.4 wt %; about 2.5 wt %; about 2.6 wt %; about 2.7 wt %; about 2.8 wt %; about 2.9 wt %; or about 3.0 wt %.

Crosslinker

In some embodiments, a fracturing composition includes a crosslinker. In some such embodiments, the crosslinker does not include aluminum isopropoxide, sodium aluminate or aluminum sulfate. In some embodiments, the crosslinker includes an acidic polynuclear aluminum halide composition. In some other embodiments, the crosslinker includes an acidic polynuclear aluminum chloride composition. In some embodiments, the acidic polynuclear aluminum halide has an empirical formula of $Al_x(OH)_yCl_{(3x-y)}$ where $0<x<3y$. In some such embodiments, it is not necessary to partially or completely neutralize the acid polynuclear aluminum halide composition or the acidic polynuclear aluminum chloride composition when used as a crosslinker in combination with a phosphate composition.

In some embodiments, a crosslinker includes polyaluminum chloride composition having an Al:Cl mole ratio ranging from: about 1.40:1 to about 2.20:1; about 1.50:1 to about 2.10:1; about 1.50:1 to about 1.80:1; or about 1.90:1 to about 2.10:1 In some embodiments, a crosslinker includes polyaluminum chloride having an Al:Cl mole ratio of about 1.50:1; about 1.60:1; about 1.70:1; about 1.80:1; about 1.90:1; about 2.00:1; or about 2.10:1.

In some embodiments, the acidic polynuclear aluminum chloride composition may include a polyamine. In some such embodiments the polyamine is a polyhydroxylalkylamine or a polyquaternary amine. The nitrogen atom of the polyhydroxylalkylamine may be linked by a straight or branched chain alkyl group having 2 to 20 carbon atoms. In one such embodiment, the nitrogen atom of the polyhydroxylalkylamine may be linked by alkyl groups including ethyl, propyl, butyl, pentyl or hexyl groups.

In some embodiments, a crosslinker includes about 20 wt % to about 30 wt % $Al_2O_3$; about 20 wt % to about 25 wt %

$Al_2O_3$; about 20 wt % to about 22 wt % $Al_2O_3$; or about 20.2 wt % to about 21.7 wt % $Al_2O_3$. In some embodiments, a crosslinker includes about 20 wt % $Al_2O_3$; about 21 wt % $Al_2O_3$; about 22 wt % $Al_2O_3$; about 23 wt % $Al_2O_3$; about 24 wt % $Al_2O_3$; or about 25 wt % $Al_2O_3$. In some embodiments, a crosslinker includes about 20.0 wt % $Al_2O_3$; about 20.2 wt % $Al_2O_3$; about 20.4 wt % $Al_2O_3$; about 20.6 wt % $Al_2O_3$; about 20.8 wt % $Al_2O_3$; about 21.0 wt % $Al_2O_3$; about 21.2 wt % $Al_2O_3$; about 21.4 wt % $Al_2O_3$; about 21.6 wt % $Al_2O_3$; about 21.8 wt % $Al_2O_3$; about 22.0 wt % $Al_2O_3$; about 22.2 wt % $Al_2O_3$; about 22.4 wt % $Al_2O_3$; about 22.6 wt % $Al_2O_3$; about 22.8 wt % $Al_2O_3$; about 23.0 wt % $Al_2O_3$; about 23.2 wt % $Al_2O_3$: about 23.4 wt % $Al_2O_3$: about 23.6 wt % $Al_2O_3$: about 23.8 wt % $Al_2O_3$; or about 24.0 wt % $Al_2O_3$.

In some embodiments, a crosslinker includes about 7.5 wt % to about 10.5 wt % chloride; about 8.0 wt % to about 10.0 wt % chloride; about 8.0 wt % to about 9.5 wt % chloride; or about 8.3 wt % to about 9.2 wt % chloride. In some embodiments, a crosslinker includes about 7.5 wt % chloride; about 7.6 wt % chloride; about 7.7 wt % chloride; about 7.8 wt % chloride; about 7.9 wt % chloride; about 8.0 wt % chloride; about 8.1 wt % chloride; about 8.2 wt % chloride; about 8.3 wt % chloride; about 8.4 wt % chloride; about 8.5 wt % chloride; about 8.6 wt % chloride; about 8.7 wt % chloride; about 8.8 wt % chloride; about 8.9 wt % chloride; about 9.0 wt % chloride; about 9.1 wt % chloride; about 9.2 wt % chloride; about 9.3 wt % chloride; about 9.4 wt % chloride; about 9.5 wt % chloride; about 9.6 wt % chloride; about 9.7 wt % chloride; about 9.8 wt % chloride; about 9.9 wt % chloride; or about 10.0 wt % chloride.

In some embodiments, the crosslinker includes: about 10.7 wt. % to about 13.0 wt. % aluminum; about 10.7 wt. % to about 11.5 wt. % aluminum; about 11.0 wt. % to about 13.0 wt. % aluminum; about 12.0 wt. % to about 13.0 wt. % aluminum; or about 12.0 wt. % to about 12.7 wt. % aluminum. In some other embodiments, the crosslinker includes: about 10.8 wt. % aluminum; about 11.0 wt. % aluminum; about 11.2 wt. % aluminum; about 11.4 wt. % aluminum; about 11.6 wt. % aluminum; about 11.8 wt. % aluminum; about 12.0 wt. % aluminum; about 12.2 wt. % aluminum; about 12.4 wt. % aluminum; about 12.6 wt. % aluminum; about 12.8 wt. % aluminum; or about 13.0 wt. % aluminum.

In some embodiments, a crosslinker has a specific gravity at 15° C. of about 1.27 to about 1.37; about 1.28 to about 1.36; about 1.29 to about 1.35; or about 1.30 to about 1.34. In some embodiments, a crosslinker has a specific gravity at 15° C. or about 1.27; about 1.28; about 1.29; about 1.30; about 1.31; about 1.32; about 1.34; about 1.35; about 1.36; or about 1.37.

In some embodiments, a fracturing fluid composition includes a crosslinker in an amount effective to form a gel in combination with a phosphate containing entity. In some embodiments, a fracturing composition includes a crosslinker in an amount to provide a molar ratio to the phosphate of from about 0.1:1 to about 2.0:1, about 0.2:1 to about 1.5:1; or about 0.2:1 to about 1.2:1. In some embodiments, a fracturing composition includes a crosslinker in an amount to provide a molar ratio to the phosphate of about 0.1:1; about 0.2:1; about 0.3:1; about 0.4:1; about 0.5:1; about 0.6:1; about 0.7:1; about 0.8:1; about 0.9:1; about 1.0:1; about 1.1:1; about 1.2:1; about 1.3:1; about 1.4:1; about 1.5:1; about 1.6:1; about 1.7:1; about 1.8:1; about 1.9:1; about 2.0:1; or about 2.1:1.

In some embodiments, a fracturing composition includes an acidic polynuclear aluminum chloride in an amount to provide a molar ratio to the phosphate of from about 0.1:1 to about 2.0:1, about 0.2:1 to about 1.5:1; or about 0.2:1 to about 1.2:1. In some embodiments, a fracturing composition includes an acidic polynuclear aluminum chloride in an amount to provide a molar ratio to the phosphate of about 0.1:1; about 0.2:1; about 0.3:1; about 0.4:1; about 0.5:1; about 0.6:1; about 0.7:1; about 0.8:1; about 0.9:1; about 1.0:1; about 1.1:1; about 1.2:1; about 1.3:1; about 1.4:1; about 1.5:1; about 1.6:1; about 1.7:1; about 1.8:1; about 1.9:1; about 2.0:1; or about 2.1:1.

In some embodiments, a fracturing composition includes an acidic polynuclear aluminum chloride in an amount ranging from 0.2 wt. % to about 0.8 wt. % based on the weight of the hydrocarbon liquid. In other embodiments, the amount of acidic polynuclear aluminum chloride ranges from 0.3 wt. % to about 0.7 wt. % based on the weight of the hydrocarbon liquid. In other embodiments, the amount of acidic polynuclear aluminum chloride ranges from 0.4 wt. % to about 0.6 wt. % based on the weight of the hydrocarbon liquid.

Hydrocarbon Liquid

In some embodiments, a fracturing composition includes a hydrocarbon liquid. Suitable hydrocarbon liquids include but are not limited to gasoline, diesel oil, crude oil, or kerosene.

Additional Components

In some embodiments, the fracture composition may include water. In such compositions, the water concentration may range from: about 0.05 wt % to about 2.0 wt. %; about 0.1 wt % to about 1.0 wt %; about 0.1 wt % to about 0.6 wt %; about 0.1 wt % to about 0.5 wt %; and about 0.2 wt % to about 0.4 wt %. In other embodiments, the fracturing composition may include a pH regulating material, such as soda ash. In some embodiments, this pH regulating material is not soluble in the hydrocarbon continuous phase. After the fracturing is complete, produced waters may contaminate the fracturing fluid. The pH regulating material may then become soluble, thereby increasing the pH of the system and breaking the viscosity to allow a more effective oil flow back into the producing well.

Preparation of Fracturing Composition

Pumping services or stimulation or fracture engineers select fracturing fluids and preparation of these fluids based on well-specific characteristics. Such characteristics include, but are not limited to, well-bore geology, depth, targeted fracture length, anticipated field production characteristics, and economics. In oil based fracturing, produced crude oil may be utilized as the continuous phase. Since crude oil varies significantly from well to well, fracturing formulations and preparations may vary significantly. In general, with opportunity for significant variations, the phosphate, hydrocarbon continuous phase, and crosslinker are blended in one or more fracturing tanks at the appropriate concentrations to form the desired viscosity or gel. In some embodiments, pH regulating additives or gel breaking agent are blended into the gel. The gelled hydrocarbon is pumped from the fracturing tanks, mixed with proppant, and pumped down the well bore at the defined fracturing pressure. In some embodiments the hydrocarbon continuous phase is pumped from the fracturing tank separately from either the phosphate and/or the crosslinker and/or proppant and/or pH regulating additive to form a gel while in the annulus.

In some embodiments, a phosphate and a crosslinker, in amounts as described above, are dispersed in a hydrocarbon liquid to be used as a fracturing composition. In some embodiments, dissolution of a phosphate and crosslinker in the hydrocarbon results in gelling of the hydrocarbon. In some embodiments a pH regulating additive or a gel breaker is added to the gelled hydrocarbon. In some embodiments, the resulting hydrocarbon gel is generally stable to heat or bottom hole temperatures, and the degree of gelling may be controlled by the concentration of the phosphate in the liquid.

Method

Use for Fracturing

In some embodiments, a fracturing composition of some embodiments of the present invention is useful for fracturing in subterranean formations. A fracturing composition may be introduced into a subterranean formation under pressure sufficient to accomplish fracturing by enlarging and extending a fissure in the formation. The formation may be kept under elevated pressure for several hours to further extend the fissure in the formation. The gelled hydrocarbon maintains a stable viscosity under the elevated pressure and downhole temperatures. After the fracture is complete, the pressure is released, intrusion of formation water may solubilize the pH regulating additive, and the gels or viscosity is broken. In some embodiments, gel breakers have a delayed mechanism other than solubilizing in produced waters. This delay is typically a few hours to allow the fracturing to be completed before gel destruction.

In some embodiments, a method of fracturing a subterranean formation includes adding a phosphate and a crosslinker to a hydrocarbon liquid to be used as a fracturing fluid, wherein each component is as described above, and fracturing a subterranean formation with this hydrocarbon liquid. In some embodiments, a method of fracturing a subterranean formation includes adding to a hydrocarbon liquid to be used as a fracturing fluid: (a) about 0.5 wt. % to about 2.0 wt. % based on a weight of the hydrocarbon liquid, of an organic phosphate of the formula $HPO_4R^1R^2$ where $R^1$ and $R^2$ are each independent selected from the group consisting of: a straight or branch chain alkyl group, aryl group, alkoxy group or alkaryl group each having from 6 to about 18 carbon atoms, and (b) about 0.2 wt. % to about 2.0 wt. % based on the weight of the hydrocarbon liquid of an acidic polynuclear aluminum compound having an Al:Cl mole ratio ranging from about 1.40:1 to about 2.2:1, wherein the fracturing fluid composition is characterized by a substantially constant viscosity value; and fracturing a subterranean formation with this hydrocarbon liquid. In some embodiments, a method of fracturing a subterranean formation includes adding to a hydrocarbon liquid to be used as a fracturing fluid: (a) about 0.6 wt. % to about 0.9 wt. % based on a weight of the hydrocarbon liquid, of an organic phosphate of the formula $HPO_4R^1R^2$ where $R^1$ and $R^2$ are each independent selected from the group consisting of: a straight or branch chain alkyl group, aryl group, alkoxy group or alkaryl group each having from 6 to about 18 carbon atoms, and (b) about 0.2 wt. % to about 0.8 wt. % based on the weight of the hydrocarbon liquid of an acidic polynuclear aluminum compound having an Al:Cl mole ratio ranging from about 1.40:1 to about 2.2:1, wherein the fracturing fluid composition is characterized by a substantially constant viscosity value; and fracturing a subterranean formation with this hydrocarbon liquid.

Benefits

Fracturing compositions of the present invention may provide several benefits for use in fracturing subterranean formations. In some embodiments, a fracturing composition of the present invention demonstrates lower sensitivity of crosslinker concentration to the rheological profile, higher efficiency, and/or higher effectiveness in viscosity or gel formation for carrying proppant more efficiently for fracturing oil and gas wells. In some embodiments, a fracturing composition demonstrates a substantially constant viscosity value as a function of crosslinker concentration and constant phosphate concentration. In some embodiments, a fracturing composition demonstrates a substantially constant viscosity value as a function of crosslinker concentration and constant phosphate concentration with no breakpoint with respect to a broad concentration range of crosslinker as described herein. The break-point, as used herein, is understood to mean a reduction in the highest or peak viscosity for a given concentration of phosphate and a concentration range of crosslinker. In some embodiments, a fracturing composition demonstrates no break-point at a lower or higher concentration of phosphate and/or crosslinker than known fracturing compositions. In some embodiments, a fracturing composition demonstrates a higher viscosity for a given concentration of phosphate than that demonstrated by known fracturing compositions with the same phosphate concentration. In some embodiments, a fracturing composition using number 2 diesel oil and about 2.0 wt % phosphate demonstrates a viscosity peak at 300 RPM Fann Reading of greater than about 150 which is substantially constant over a cross linker concentration of about 0.4 wt % to about 1.2 wt %. In some embodiments, a fracturing composition using number 2 diesel oil and about 2.0 wt % phosphate demonstrates a viscosity peak at 300 RPM Fann Reading between about 150 and about 175 which is substantially constant over a cross linker concentration of about 0.4 wt % to about 1.2 wt %. In some embodiments, a fracturing composition using number 2 diesel oil and about 2.0 wt % phosphate demonstrates a viscosity plateau at about 0.4 wt % to about 1.2 wt % crosslinker.

EXAMPLES

For the below Comparative Examples and Inventive Examples, VDYZ-100 from Elementis Specialties, Inc was used for the phosphate ester source. VDYZ-100 is a mixed decyl, ethyl and octyl phosphate ester having a specific gravity of 1.0 gram/ml.

Comparative Example 1

An aluminum isopropoxide solution was prepared by dissolving 20 ml of aluminum isopropoxide, Manalox 130, in 80 ml number 2 diesel oil. A fracturing composition was prepared by mixing 250 ml diesel oil, 2 ml phosphate ester, and 1.875 ml of 20 vol. % aluminum isopropoxide. The components were combined and mixed for five minutes at 25° C. The gelled sample was then transferred to a Fann viscometer and dial readings made at 300 rpm and 100 rpm. Viscosity test results are included in Table 1 below.

Comparative Example 2

An aluminum isopropoxide solution was prepared by dissolving 20 ml of aluminum isopropoxide, Manalox 130, in 80 ml number 2 diesel oil. A fracturing composition was prepared by mixing 250 ml diesel oil, 2 ml phosphate ester, and 3.125 ml of 20 vol. % aluminum isopropoxide solution. The components were combined and mixed for one minute, then for five minutes at 25° C. The gelled sample was then transferred to a Fann viscometer and dial readings made at 300 rpm and 100 rpm. Viscosity test results are included in Table 1 below.

TABLE 1

|  | Value |
|---|---|
| Comparative Example 1 | |
| 300 rpm | 56 |
| 100 rpm | 40 |

TABLE 1-continued

| Value | |
|---|---|
| Comparative Example 2 | |
| 300 rpm (1 min) | 125 |
| 300 rpm (5 min) | 132 |
| 100 rpm (5 min) | 85 |

Testing Procedure

Comparative Examples 3 and 4 and Inventive Examples were tested as follows. Hydrocarbon gelling systems were prepared by first adding 250 ml of number 2 diesel oil to a vessel. While maintaining the temperature at 25° C. and stirring at 750 rpm, two (2) ml aliquots of a phosphate ester composition were added and mixed for two (2) minutes. The phosphate ester was prepared by reacting triethylphosphate, with phosphorous pentoxide and a mixture of octanol and decanol. To this solution, a predetermined volume of a cross linking compound, dissolved in solvent, was added dropwise and stirred for five (5) minutes to produce a gelled sample. The gelled sample was then transferred to a Fann viscometer with dial readings made at 300 rpm. The predetermined volumes of cross linker ranged from 0.2 ml up to 3 ml in 0.2 ml increments.

Comparative Example 3,

Aluminum isopropoxide was used as the cross linker composition. An aluminum isopropoxide solution was prepared by dissolving 20 ml of aluminum isopropoxide, Manalox 130, in 80 ml number 2 diesel oil. Manalox 130 has a specific gravity of 0.92 gram/ml and aluminum content of 10.1 wt. %. FIG. 1 shows a plot of aluminum isopropoxide concentration, as ml of a 20 vol. % Manalox 130 solution, versus viscosity of the hydrocarbon system based on the 300 rpm Fann reading. As shown in FIG. 1, the hydrocarbon viscosity increases up to a value of ~232 Fann reading at 300 rpm with increasing concentration of aluminum isopropoxide up to a maximum of approximately 3 ml of a 20 vol. % Manalox 130 solution. At 3.2 ml of the 20 vol. % aluminum isopropoxide concentration, the hydrocarbon viscosity value decreased abruptly to 98 or by 58%.

Comparative Example 4

Figure 2:
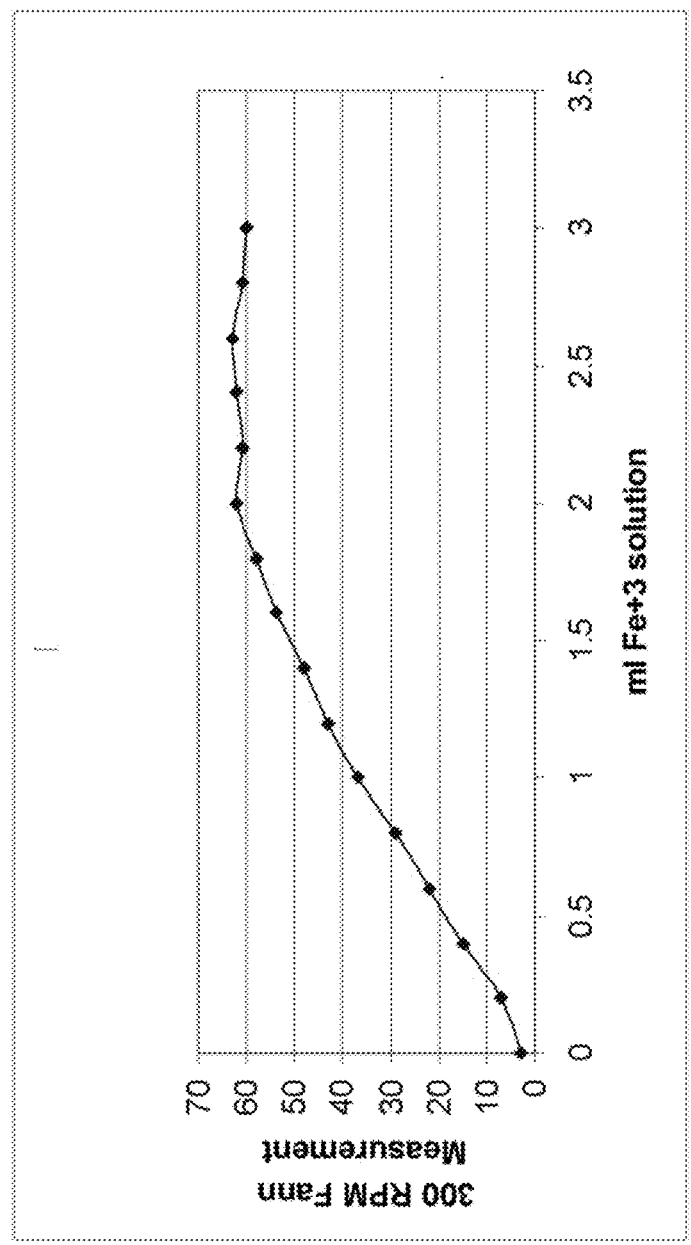
FIG. 2 illustrates the gelling performance of a prior art ferric crosslinking system.

A ferric composition was used as the cross linker composition. A ferric composition was a liquid having a specific gravity of 136 gram/ml. FIG. 2 shows a plot of ferric salt concentration, as ml of the $Fe^{+3}$ solution, versus hydrocarbon viscosity based on the 300 rpm Fann reading. As shown in FIG. 2, the hydrocarbon viscosity increases with increasing $Fe^{+3}$ concentration, up to a value of ~62 Fann reading at 300 rpm at 2 ml ferric solution From 2.2 ml to 3 ml of the $Fe^{+3}$ solution, the hydrocarbon viscosity declined by ~3% based on the Fann reading at 300 rpm.

Comparative Example 5

Figure 3:
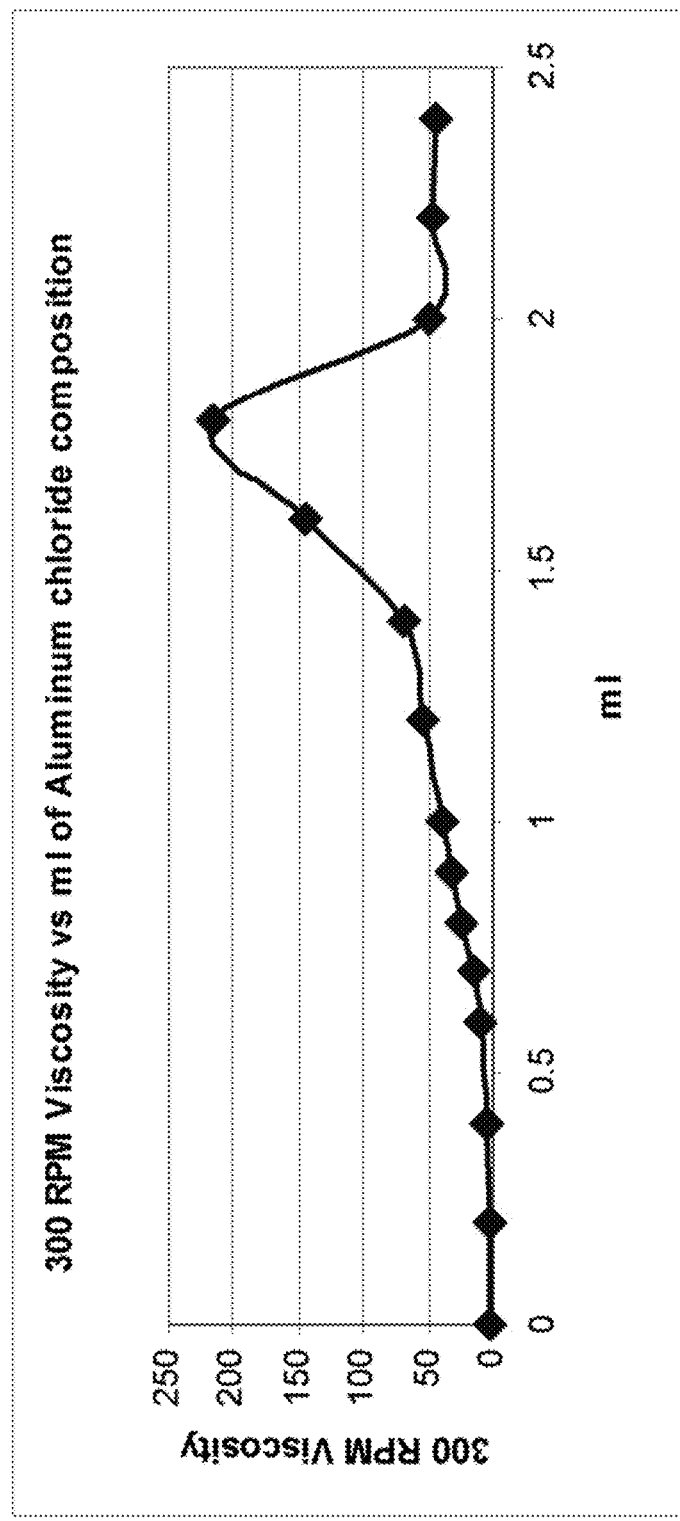
FIG. 3 illustrates the gelling performance of an aluminum chloride crosslinking system.

An aluminum chloride composition having an Al:Cl molar ratio of 0.75:1 to 0:95:1, 9.8 wt. % to 10.8 wt. % aluminum and a specific gravity of 1.30-1.35 gram/ml was used as the cross linker composition. An aluminum chloride/water solution was prepared by dissolving 50 ml of the aluminum chloride compound in 50 ml of water. FIG. 3 shows a plot of aluminum chloride concentration, as ml of the 50 vol. % aluminum chloride solution, versus hydrocarbon viscosity based on the 300 rpm Fann reading. As shown in FIG. 3, the hydrocarbon viscosity increased to a reading of 215 at 1.8 ml of the aluminum chloride solution. At 1.9 ml of the aluminum chloride solution, the viscosity abruptly declined to a viscosity value of 48 or 77%.

Inventive Example 1

Figure 4:
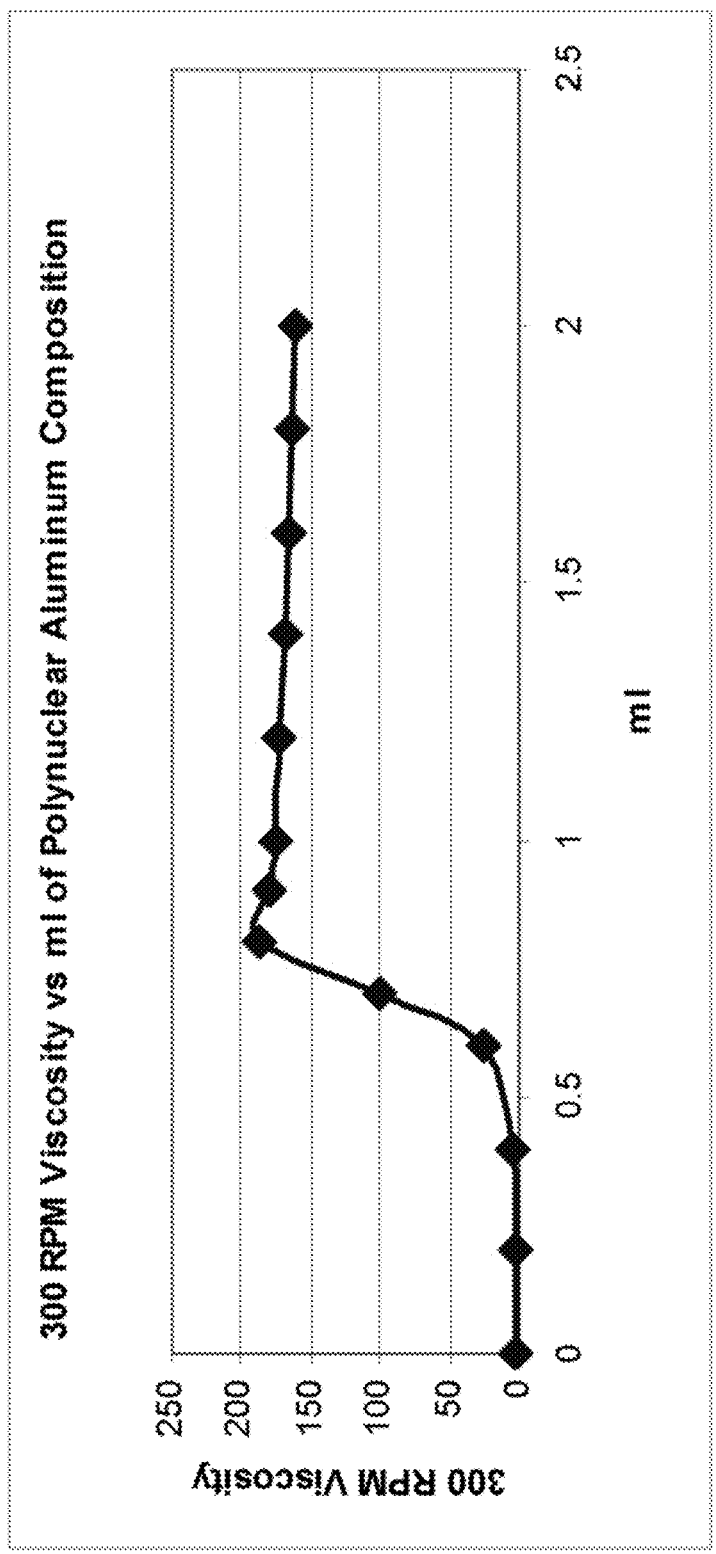
FIG. 4 illustrates the gelling performance of an inventive acidic polynuclear aluminum chloride crosslinking system.

An acidic polynuclear aluminum chloride composition, having an Al:Cl molar ratio of 1.50:1-1.80:1, 10.7 wt. % to 11.5 wt. % aluminum and a specific gravity of 1.3-1.34 g/mole was used as the cross linker composition. An aluminum chloride/water solution was prepared by dissolving 50 ml of the aluminum chloride compound in 50 ml of water. FIG. 4 shows a plot of aluminum chloride concentration, as ml of the 50 vol. % aluminum chloride solution, versus hydrocarbon viscosity based on the 300 rpm Fann reading. As shown in FIG. 4, the hydrocarbon viscosity increased to a reading of 187 at 0.8 ml of the aluminum chloride solution. From 0.9 ml to 2.0 ml of the aluminum chloride solution, the hydrocarbon viscosity was substantially constant ranging from 179 to 161 or a variation of only 10%. The water content of the gelled hydrocarbon ranged from 0.1 to 0.45 wt. %.

Inventive Example 2

Figure 5:
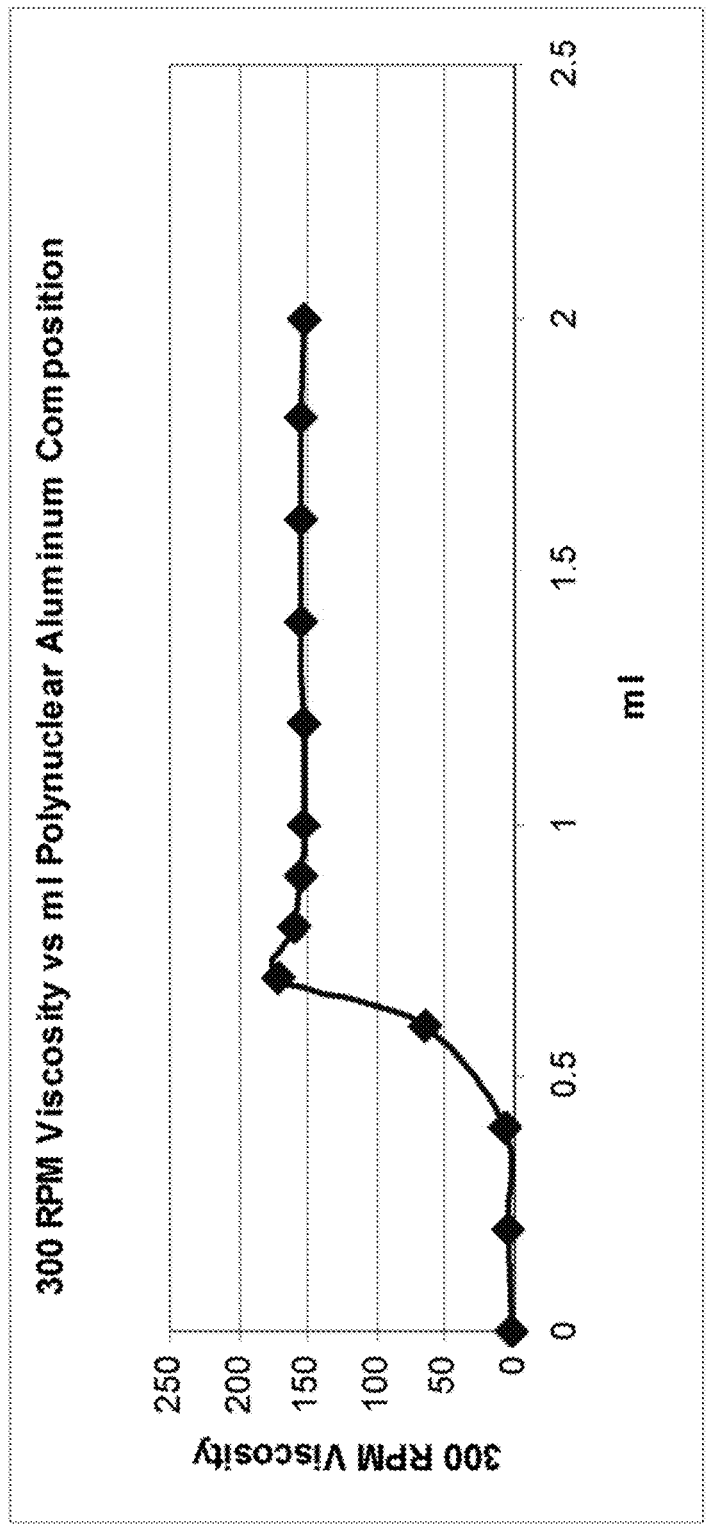
FIG. 5 illustrates the gelling performance of an inventive acidic polynuclear aluminum chloride crosslinking systems.

An acidic polynuclear aluminum chloride composition, having an Al:Cl molar ratio of 1.90:1-2.10:1, 12.1 wt. % to 12.7 wt. % aluminum and a specific gravity of 1.33-1.35 gram/ml was used as the cross linker composition. An aluminum chloride/water solution was prepared by dissolving 50 ml of the aluminum chloride compound, in 50 ml of water. FIG. 5 shows a plot of aluminum chloride concentration, as ml of the 50 vol. % aluminum chloride solution, versus hydrocarbon viscosity based on the 300 rpm Fann reading. As shown in FIG. 5, the hydrocarbon viscosity increased to a reading of 170 at 0.7 ml of the aluminum chloride solution. From 0.9 ml to 2.0 ml of the aluminum chloride solution, the hydrocarbon viscosity was substantially constant ranging from 159 to 154 or a variation of only 3%. The water content of the gelled hydrocarbon ranged from 0.1 to 0.45 wt. %.

Inventive Example 3

Figure 6:
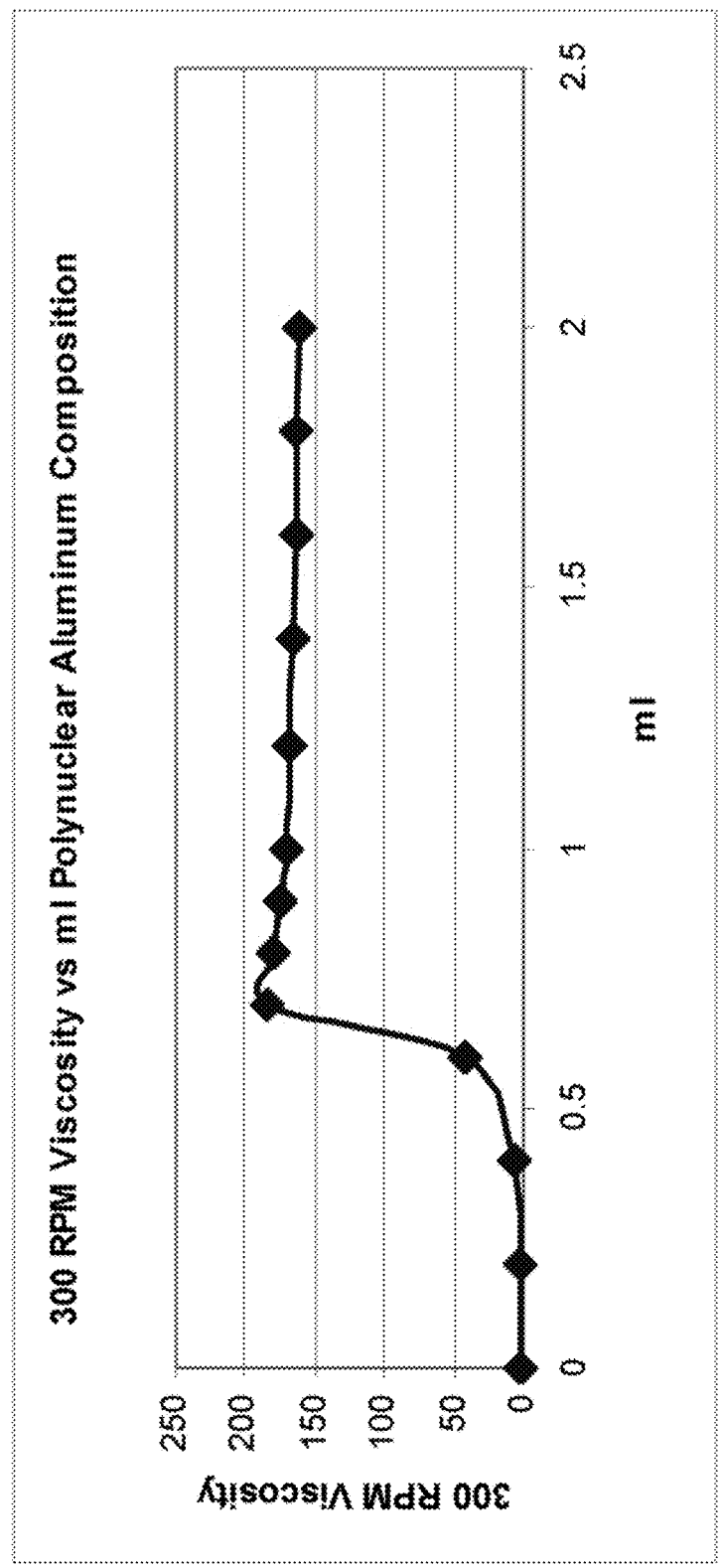
FIG. 6 illustrates the gelling performance of an inventive acidic polynuclear aluminum chloride crosslinking system.

A second acidic polynuclear aluminum chloride composition, having an Al:Cl molar ratio of 1.90:1-2.10:1 and 12.1 wt. % to 12.7 wt. % aluminum was used as the cross linker composition. An aluminum chloride/water solution was prepared by dissolving 50 ml of the aluminum chloride compound in 50 ml of water. FIG. 6 shows a plot of aluminum chloride concentration, as ml of the 50 vol. % aluminum chloride solution, versus hydrocarbon viscosity based on the 300 rpm Fann reading. As shown in FIG. 6, the hydrocarbon viscosity increased to a reading of 185 at 0.7 ml of the aluminum chloride solution. From 0.9 ml to 2.0 ml of the aluminum chloride solution, the hydrocarbon viscosity was substantially constant ranging from 175 to 161 or a variation of only 8%. The water content of the gelled hydrocarbon ranged from 0.1 to 0.45 wt. %.

Inventive Examples 1, 2 and 3 demonstrate the unexpected results for acidic polynuclear aluminum chloride compositions to act as cross linkers over a range of aluminum content and water content. The aluminum compositions in combination with a phosphate ester produce hydrocarbon gels with viscosity values that are significantly higher compared to the ferric cross linker. Furthermore, the compositions also provide improved viscosity stability with increasing aluminum concentration compared to the prior art basic aluminum isopropoxide cross linker. The presence of water does not diminish the ability of the aluminum chloride compositions to perform as crosslinkers.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

We claim:

1. A fracturing composition comprising:
   (a) a hydrocarbon liquid,
   (b) about 0.6 wt. % to about 0.9 wt. % based on a weight of the hydrocarbon liquid, of a mixture of phosphate esters, said esters selected from the group consisting of: monoester $PO(OR^1)(OH)_2$, $PO(OR^2)(OH)_2$, diester $PO(OH)(OR^1)_m(OR^2)_{2-m}$ where m=0, 1, or 2; triester $PO(OH)(OR^1)_n(OR^2)_{3-n}$ where n=0, 1, 2 or 3; and phosphoric acid $H_3PO_4$ wherein $R^1$ and $R^2$ each have 2 to 18 carbon atoms; and
   (c) about 0.2 wt. % to about 0.8 wt. % based on the weight of the hydrocarbon liquid of an acidic polynuclear aluminum compound having an Al:Cl mole ratio ranging from about 1.40:1 to about 2.2:1, and wherein the acidic polynuclear aluminum compound is not partially or completely neutralized,
   wherein said fracturing composition is characterized by a substantially constant viscosity value.

2. The composition of claim 1 wherein $R^2$ is selected from the group consisting of hexyl, octyl, decyl and dodecyl.

3. The composition of claim 2 wherein $R^1$ is ethyl.

4. The composition of claim 1 wherein $R^1$ is ethyl and $R^2$ is selected from the group consisting of octyl and decyl.

5. The composition of claim 1 wherein $R^1$ and $R^2$ each have 2 to 12 carbon atoms.

6. The composition of any of claims 1-5 wherein a molar ratio of aluminum ion in the polynuclear aluminum compound to organic phosphate ranges from about 0.2:1 to about 2.0:1.

7. The composition of any of claims 1-5 wherein a molar ratio of the polyaluminum chloride to the organic phosphate ranges from about 0.4:1 to about 1.5:1.

8. A composition comprising:
   a mixture of phosphate esters, said esters selected from the group consisting of: monoester $PO(OR^1)(OH)_2$, $PO(OR^2)(OH)_2$; diester $PO(OH)(OR^1)_m(OR^2)_{2-m}$ where m=0, 1, or 2; triester $PO(OH)(OR^1)_n(OR^2)_{3-n}$ where n=0, 1, 2 or 3; and phosphoric acid $H_3PO_4$ wherein $R^1$ and $R^2$ each have 2 to 18 carbon atoms; and
   an acidic polynuclear aluminum compound having a formula of $Al_x(OH)_yCl_{(3x-y)}$, wherein x is 2 and y is 5, and wherein the acidic polynuclear aluminum compound is not partially nor completely neutralized.

9. The composition of claim 8 further comprising a polyamine compound selected from the group consisting of a polyhydroxylalkylamine and a polyquaternary amine.

10. The composition of claim 8, wherein $R^2$ is selected from the group consisting of hexyl, octyl, decyl and dodecyl.

11. The composition of claim 10 wherein $R^1$ is ethyl.

12. The composition of claim 8, wherein $R^1$ is ethyl and $R^2$ is selected from the group consisting of octyl and decyl.

13. The composition of claim 8, wherein $R^1$ and $R^2$ each have 2 to 12 carbon atoms.

* * * * *